United States Patent
Nie et al.

(10) Patent No.: US 11,461,284 B2
(45) Date of Patent: Oct. 4, 2022

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: YuHong Nie, Shanghai (CN); Pengfei Wu, Shanghai (CN); Tianxiang Chen, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 207 days.

(21) Appl. No.: 16/836,176

(22) Filed: Mar. 31, 2020

(65) Prior Publication Data
US 2021/0216507 A1 Jul. 15, 2021

(30) Foreign Application Priority Data
Jan. 15, 2020 (CN) .......................... 202010043186.4

(51) Int. Cl.
*G06F 16/182* (2019.01)
*G06N 3/08* (2006.01)
*G06F 16/22* (2019.01)
*G06F 16/13* (2019.01)

(52) U.S. Cl.
CPC .......... *G06F 16/182* (2019.01); *G06F 16/137* (2019.01); *G06F 16/2255* (2019.01); *G06N 3/08* (2013.01)

(58) Field of Classification Search
None
See application file for complete search history.

(56) References Cited

U.S. PATENT DOCUMENTS

| | | | | |
|---|---|---|---|---|
| 11,068,162 | B1* | 7/2021 | Meister | ................. G06F 3/0688 |
| 2012/0117605 | A1* | 5/2012 | Miao | .................. H04N 21/4788 |
| | | | | 725/115 |
| 2015/0142807 | A1* | 5/2015 | Hofmann | ................. G06N 3/02 |
| | | | | 707/737 |

(Continued)

OTHER PUBLICATIONS

Kuhn et al., "Integration of Sharable Containers with Distributed Hash Tables for Storage of Structured and Dynamic Data", International Conference on Complex, Intelligent and Software Intensive Systems, 2009 IEEE, 6 pages, DOI 10.1109/CISIS.2009.53.*

(Continued)

*Primary Examiner* — Uyen T Le
(74) *Attorney, Agent, or Firm* — Ryan, Mason & Lewis, LLP

(57) ABSTRACT

A method for storage management comprises: obtaining, at a first storage service deployed at a first node, a first request of a first computing service deployed at the first node for first target data, the first storage service having access to a remote storage device and providing the first computing service with a same access interface as the remote storage device, the remote storage device storing a dataset reusable in a task to be performed at least partially by the first computing service, the dataset comprising the first target data; obtaining, based on the first request, the first target data from the remote storage device or a local storage space for the first storage service; and providing the first target data to the first computing service.

20 Claims, 10 Drawing Sheets

(56) References Cited

U.S. PATENT DOCUMENTS

| | | | | |
|---|---|---|---|---|
| 2018/0189635 | A1* | 7/2018 | Olarig | G06F 16/951 |
| 2019/0324805 | A1* | 10/2019 | Peng | G06F 9/4887 |
| 2019/0361626 | A1* | 11/2019 | East | G06F 3/0629 |
| 2020/0074347 | A1* | 3/2020 | Sankaran | G06N 3/105 |

OTHER PUBLICATIONS

Emil Sit, "Storing and Managing Data in a Distributed Hash Table", Doctoral Theses Collections, Massachusetts Institute of Technology. Jun. 2008, 90 pages.*

Jingya Zhou, Wen He. A Novel Resource Provisioning Model for DHT-Based Cloud Storage Systems. 11th IFIP International Conference on Network and Parallel Computing (NPC), Sep. 2014, Ilan, Taiwan, pp. 257-268, 10.1007/978-3-662-44917-2_22. hal-01403091.* docs.aws.amazon.com, "Multipart Upload Overview," https://docs.aws.amazon.com/AmazonS3/latest/dev/mpuoverview.html, Dec. 5, 2019, 6 pages.

aws.amazon.com, "Amazon S3 Pricing," https://aws.amazon.eom/s#/pricing/, Dec. 5, 2019, 6 pages.

ipfs.io, "IPFS," https://ipfs.io/, Dec. 5, 2019, 2 pages.

* cited by examiner

METHOD, DEVICE AND COMPUTER PROGRAM PRODUCT FOR STORAGE MANAGEMENT

RELATED APPLICATION(S)

The present application claims priority to Chinese Patent Application No. 202010043186.4, filed Jan. 15, 2020, and entitled "Method, Device and Computer Program Product for Storage Management," which is incorporated by reference herein in its entirety.

FIELD

Embodiments of the present disclosure generally relate to computer technologies, and more specifically, to a method, device and computer program product for storage management.

BACKGROUND

Deep learning relates to processing large-scale deep learning models or applying deep learning models to large-scale datasets. Deep learning tasks need to access large amounts of data. The data is typically stored in a remote storage device, for example, a cloud. As such, the data needs to be obtained efficiently and reliably, in particular when a deep learning task is implemented in a distributed manner.

SUMMARY

Embodiments of the present disclosure provide a method, device and computer program product for storage management.

In a first aspect of the present disclosure, a method of storage management is proposed. The method comprises: obtaining, at a first storage service deployed at a first node, a first request of a first computing service deployed at the first node for first target data, the first storage service having access to a remote storage device and providing the first computing service with a same access interface as the remote storage device, the remote storage device storing a dataset reusable in a task to be performed at least partially by the first computing service, the dataset comprising the first target data; obtaining, based on the first request, the first target data from the remote storage device or a local storage space for the first storage service; and providing the first target data to the first computing service.

In a second aspect of the present disclosure, an electronic device is proposed. The device comprises at least one processing unit and at least one memory. The at least one memory is coupled to the at least one processing unit and stores instructions to be executed by the at least one processing unit. The instructions, when executed by the at least one processing unit, cause the device to perform acts comprising: obtaining, at a first storage service deployed at a first node, a first request of a first computing service deployed at the first node for first target data, the first storage service having access to a remote storage device and providing the first computing service with a same access interface as the remote storage device, the remote storage device storing a dataset reusable in a task to be performed at least partially by the first computing service, the dataset comprising the first target data; obtaining, based on the first request, the first target data from the remote storage device or a local storage space for the first storage service; and providing the first target data to the first computing service.

In a third aspect of the present disclosure, a computer program product is proposed. The computer program product is tangibly stored on a non-transient computer-readable medium and includes machine-executable instructions which, when executed, cause a machine to perform acts comprising: obtaining, at a first storage service deployed at a first node, a first request of a first computing service deployed at the first node for first target data, the first storage service having access to a remote storage device and providing the first computing service with a same access interface as the remote storage device, the remote storage device storing a dataset reusable in a task to be performed at least partially by the first computing service, the dataset comprising the first target data; obtaining, based on the first request, the first target data from the remote storage device or a local storage space for the first storage service; and providing the first target data to the first computing service.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent, through the following detailed description of the example embodiments of the present disclosure with reference to the accompanying drawings in which the same reference symbols generally refer to the same elements.

Throughout the drawings, the same or similar reference symbols refer to the same or similar elements.

DETAILED DESCRIPTION

Preferred embodiments of the present disclosure will now be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. Rather, those embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

Figure 1:
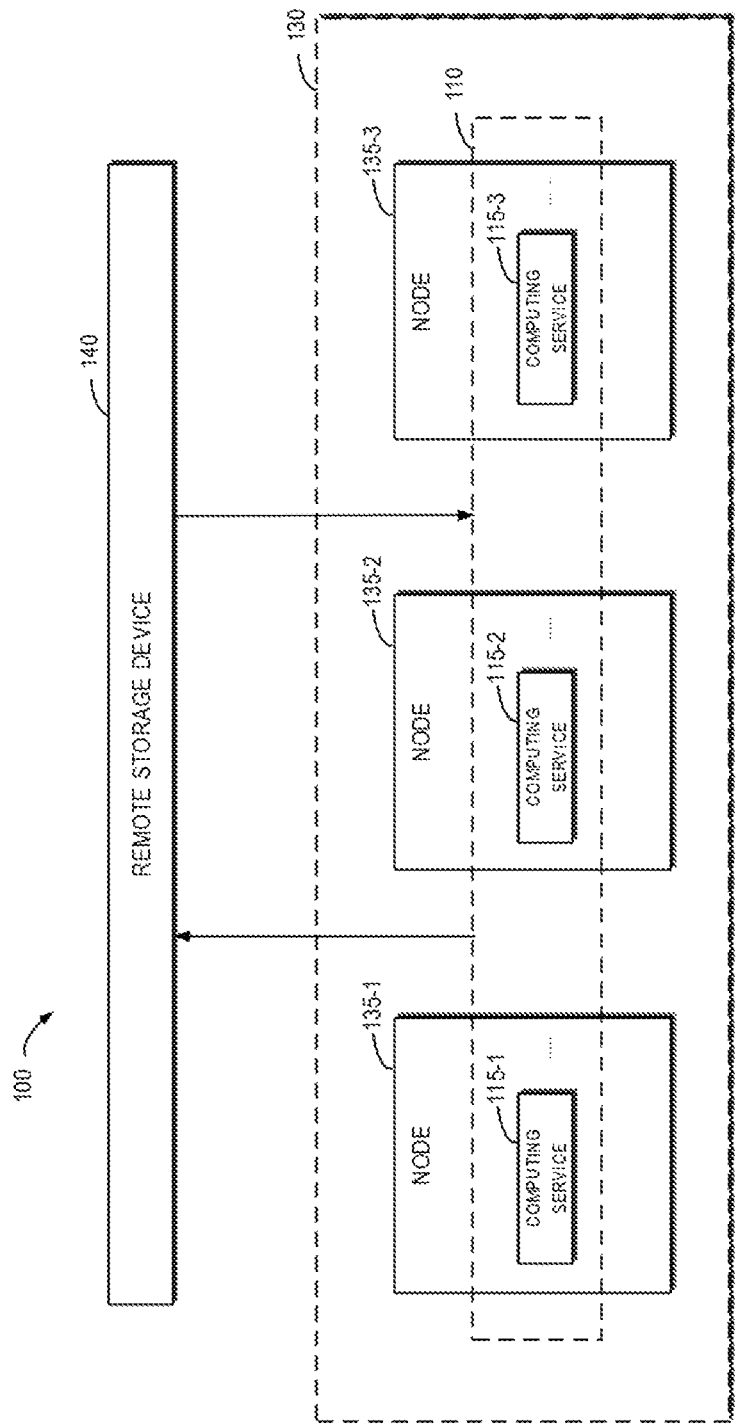
FIG. 1 illustrates a schematic diagram of an example of a traditional storage management environment.

As described above, deep learning tasks involve using massive data. Therefore, how to manage the data is crucial. FIG. 1 illustrates a schematic diagram of an example of a traditional storage management environment 100. The storage management environment 100 includes a node cluster 130 and a remote storage device 140. The node cluster 130 is deployed with a computing service cluster 110 for performing, for example, a distributed deep learning task. Data required by the distributed deep learning task is stored in the remote storage device 140, such as a cloud. The computing service cluster 110 requests the data required from the remote storage device 140 when performing the distributed deep learning task. In response, the remote storage device 140 returns the requested data to the computing service cluster 110.

More specifically, the node cluster 130 includes a plurality of nodes, such as nodes 135-1 to 135-3 (hereinafter, collectively referred to as "node 135"). Each node is deployed with at least one respective computing service, such as computing services 115-1 to 115-3 (hereinafter, collectively referred to as "computing service"). The computing service 115, when performing a part of the distributed deep learning task allocated to it, requests a part of the data required from the remote storage device 140.

If the data expected to be obtained is too large, the computing service 115 needs to send a plurality of requests to accelerate data obtaining. For example, multipart upload/download is required for handling a large data file in the remote storage device 140. Each request is directed to a part of the large data file, rather than the entire large data file. However, the logic of the data multipart upload/download needs to be implemented by users. It is a challenge for the users to coordinate multiple requests.

In addition, the distributed deep learning has a plurality of epochs. The whole dataset involved in an epoch is passed both forward and backward through the deep learning neural network. Under the current data obtaining strategy, even though a dataset has been obtained in the previous epoch, a large number of requests for obtaining the same dataset are created in the current epoch. It is because although the whole dataset is the same, the dataset in the current epoch is shuffled as compared with the one in the previous epoch. Consequently, each computing node 135 of the computing cluster 130 for performing the distributed deep learning obtains different data segments in the dataset in different epochs. Since the computing cluster 130 is unable to locally store the data persistently, the computing node 135 has to obtain a data segment continuously from the remote storage device 140 in each epoch, even though these data segments have been obtained by another computing node 135 in the previous epoch.

In addition, although it is inexpensive to store data in the remote storage device 140 such as a cloud, the cloud providers charge the users based on the number of data requests sent and the size of data downloaded if the users want to use the data. Accordingly, it is not inexpensive at all to obtain massive data from the remote storage device 140.

Moreover, even though the network bandwidth and the disk access rate of the computing cluster 130 are both large enough, it is still hard to guarantee the speed of obtaining data from the remote storage device 140. Some cloud providers have provided data transfer acceleration services, but such services still cannot ensure acceleration stability even at a high price. According to the example embodiments of the present disclosure, an improved solution for storage management is proposed. In the solution, when a computing service deployed at a node is to perform a task or a part of a task allocated to it, the computing service sends a request for data required by that part of the task to a storage service deployed at the node. The storage service has access to a remote storage device storing a dataset which is reusable in the task, and provides the computing service with the same access interface as the remote storage device. Therefore, the storage service obtains, based on a first request, first target data from the remote storage device or a local storage space for the storage service and provides the first target data to the first computing service.

In this way, the storage service, as an intermediate layer, is responsible for managing the plurality of requests of the computing service for the target data and access to the remote storage device, such that the users are freed from manual configuration of data access operations in the task handling process, and thus achieving easier and more efficient management and movement of the data associated with the task performed by the computing service. Furthermore, data can be efficiently obtained, and the cost for obtaining the data can be reduced.

Figure 2:
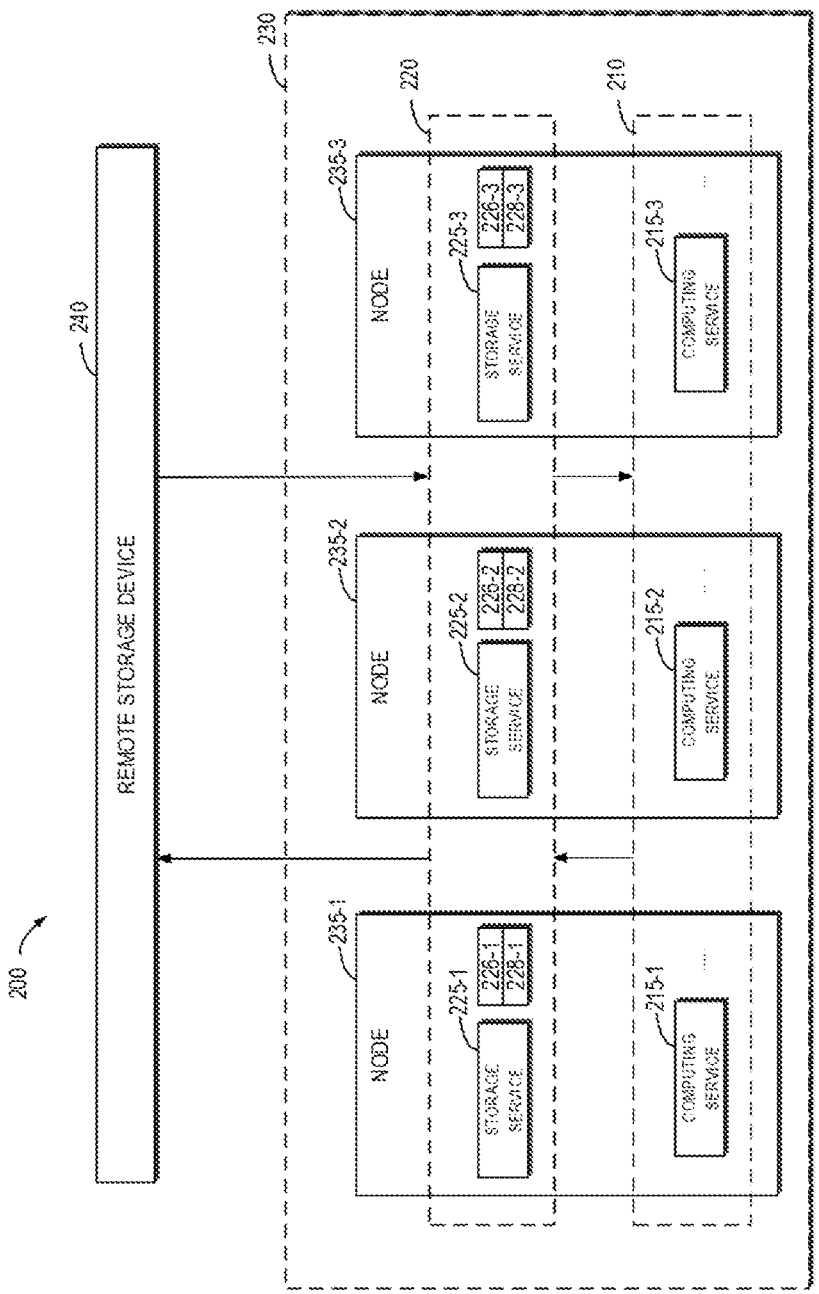
FIG. 2 illustrates a flowchart of a method for storage management according to some embodiments of the present disclosure.

Hereinafter, reference will be made to FIGS. 2-8 to describe in detail specific examples of the present solution. FIG. 2 illustrates a schematic diagram of an example of a storage management environment 200 according to some embodiments of the present disclosure. Like the storage management environment 100, the storage management environment 200 includes a node cluster 230 and a remote storage device 240. The node cluster 230 is deployed with a computing service cluster 210 for performing a task, such as a distributed deep learning task. The data required by the task is stored in a remote storage device 240, such as a cloud, a remote data storage center, a storage device connected via a network, and the like. A difference lies in that the node cluster 230 is further deployed with a storage service cluster 220.

Specifically, the node cluster 230 includes a plurality of nodes, such as nodes 235-1 to 235-3 (hereinafter, collectively referred to as "node 235"). The node 235 may be any device with computing capability, including, but not limited to, a large-scale computer, server, edge computing node, personal computer, desktop computer, laptop computer, tablet computer, personal digital assistant, and the like. In some circumstances, the node 235 may also be referred to as a client, a computing device, and the like.

Each node 235 is deployed with at least one respective computing service, such as computing services 215-1 to 215-3 (hereinafter, collectively referred to as "computing service 215). The plurality of computing services 215 may jointly perform a task, such as a distributed deep learning task, high performance computing task, big data mining task, and the like. For example, each of the plurality of computing services 215 may perform a part of the task in parallel or in series. Of course, in some implementations, a single computing service 215 may individually perform a whole non-distributed task.

In addition to the computing service 215, each node 235 is deployed with a respective storage service, such as storage services 225-1 to 225-3 (hereinafter, collectively referred to as "storage service 225"). The storage service 225 may be used to manage data required by the computing service 215 when performing the respective task. Each node 235 is also provided with a local storage device for the storage service 225, such as local storage devices 226-1 to 226-3 (hereinafter, collectively referred to as "local storage device 226"). The local storage device 226 may be used to store data required by the respective task performed by the computing service 215. In some embodiments, each node 235 is also provided with a distributed hash table, such as distributed hash tables 228-1 to 228-3 (hereinafter, collectively referred to as "distributed hash table 228"). The distributed hash table 228 may be used to locate data. How the distributed hash table 228 is used for locating data will be described in detail below.

A plurality of storage services 225 may form a storage service cluster 220. The storage service cluster 220 may act as an intermediate layer between the computing service cluster 210 and the remote storage device 240. The storage service cluster 220 has access to the remote storage device 240 and provides the computing service cluster 210 with the same access interface as the remote storage device 240. Apart from storing in the remote storage device 240 the dataset required by the computing service cluster 210 to perform the task, the storage service cluster 220 may store in its local storage space the dataset required by the computing service cluster 210 to perform the task. The local storage space comprises the local storage device 226. Since the local storage space is deployed at the same node cluster 230 as the storage service cluster 220, as compared with the remote storage device 230, such local storage space is local to the storage service cluster 220, which can provide faster data access at lower costs. It is expected that the dataset provided by the storage service 225 is reusable for the task to be performed. For example, for a distributed deep learning task, the whole dataset is identical in the current epoch and the previous epoch and thus is reusable.

In view of the above, the data request sent by the computing device 215 to the remote storage device 240 when performing the task may be received by the storage service 225 without changing its format. The storage service 225 may check whether the requested data is stored in the local storage space. If the requested data is stored in the local storage space, the storage service 225 may return the requested data to the computing service 215.

However, when the requested data is not stored in the local storage space, the storage service 225 may obtain the requested data from the remote storage device 240 and return the requested data to the computing service 215. In addition, the storage service 225 may store the data obtained, such that the computing service 215 can directly obtain the data from the local storage space when performing the task the next time, for example, in the next epoch of the distributed deep learning task, without having to obtain the data from the remote storage device 240.

In this way, the computing service 215 does not need to focus on how a plurality of requests are sent to accelerate data obtaining, nor do the users need to focus on how the logic of the multipart uploading/downloading of the data is implemented. The storage service 225, as an intermediate layer, is responsible for managing a plurality of requests of the computing service 215 for the target data and for access to the remote storage device 240. Furthermore, since the local storage space of the storage service 225 can store the data, the data obtaining is accelerated and access to the remote storage device 240 is reduced. As such, for the data reusable task, for example, a distributed deep learning task, efficient storage management with low costs can be achieved.

Figure 3:
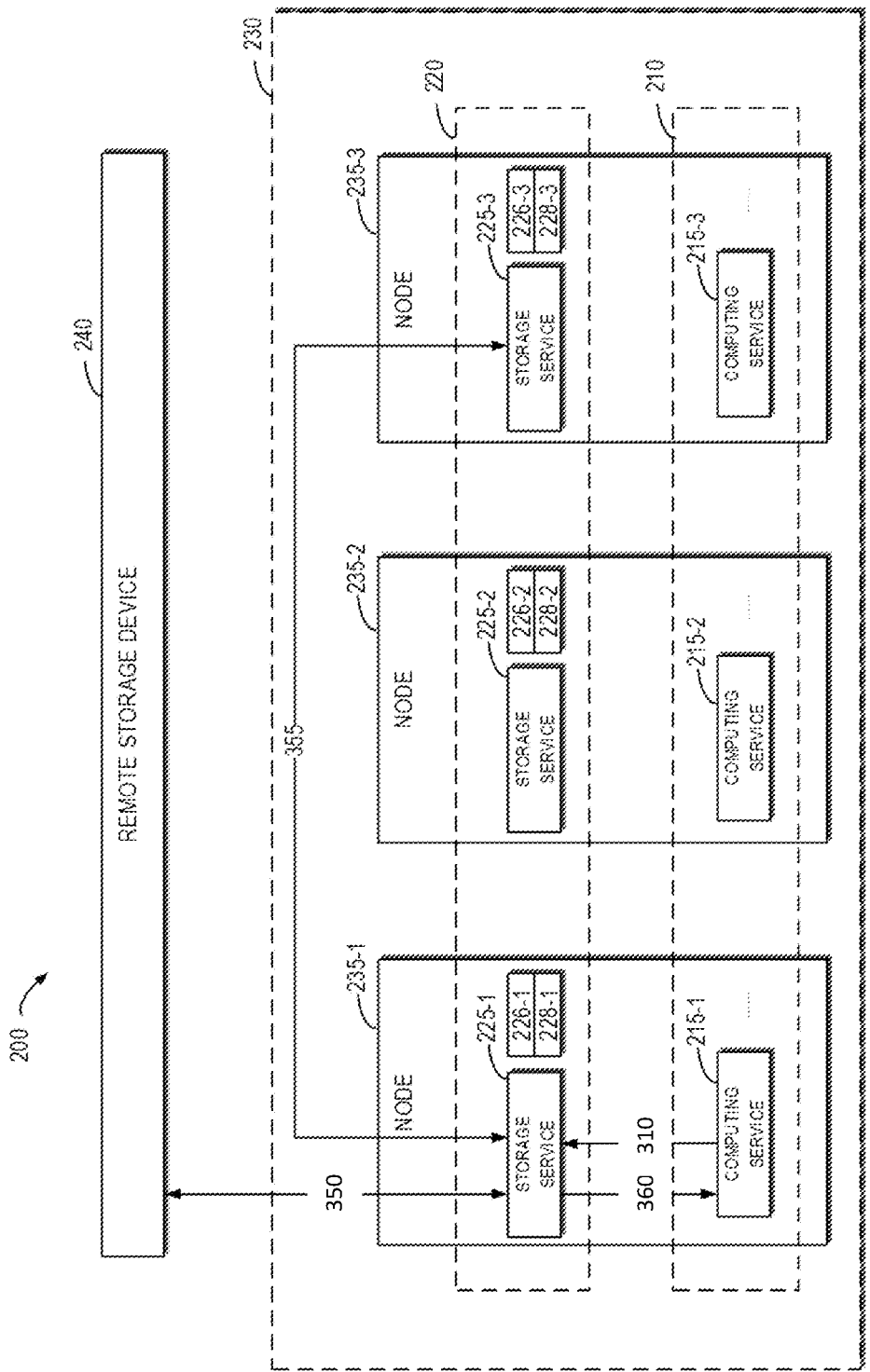
FIG. 3 illustrates a storage management example according to some embodiments of the present disclosure.

FIG. 3 illustrates a storage management example according to some embodiments of the present disclosure. In the example of FIG. 3, description will be made with reference to the storage service 225-1 responding to a data request of the computing service 215-1. It should be noted that, although the description is given with reference to the storage service 225-1, other storage services may perform a similar operation.

The storage service 225-1 and the computing service 215-1 are deployed at the node 235-1. As described above, the computing service cluster 210 may perform a task, such as a distributed deep learning task. In this case, the computing service 215-1 may perform, together with other computing services (e.g., the computing services 215-2 and 215-3) deployed at other nodes (e.g., the nodes 235-2 and 235-3), a task such as a distributed deep learning task. In other words, the computing service 215-1 may perform at least part of the task performed by the entire computing service cluster 210.

The computing service 215-1 usually needs to use respective data when performing the part of the task allocated to it. For example, the computing service 215-1 needs the data used in an epoch of the distributed deep learning task when performing the part of the distributed deep learning task allocated to it. Such data is at least part of the whole dataset used in the distributed deep learning task. To this end, the computing service 215-1 may send 310 a request for the target data to the storage service 225-1. As discussed above, the storage service 225-1 provides the computing service 215-1 with the same access interface as the remote storage device 240, and the computing service 215-1 therefore does not need to change its request format, thus achieving the compatibility with the traditional storage management environment and improving the flexibility and adaptability.

Based on the request from the computing service 215-1, the storage service 225-1 is configured to obtain 350 the requested target data from the remote storage device 240, or obtain 335 the requested target data from the local storage space of the storage service 225-3. After obtaining the target data, the storage service 225-1 provides 360 the target data to the computing service 215-1 sending the request. How the target data is specifically obtained is dependent on whether the target data is stored in a local storage space (and specifically which local storage device 226) of the respective storage service 215 of the storage service cluster 220 or the remote storage device 240. Hereinafter, reference will be made to FIGS. 4-7 to describe in detail how the storage service 225-1 obtains the target data in different circumstances.

Figure 4:
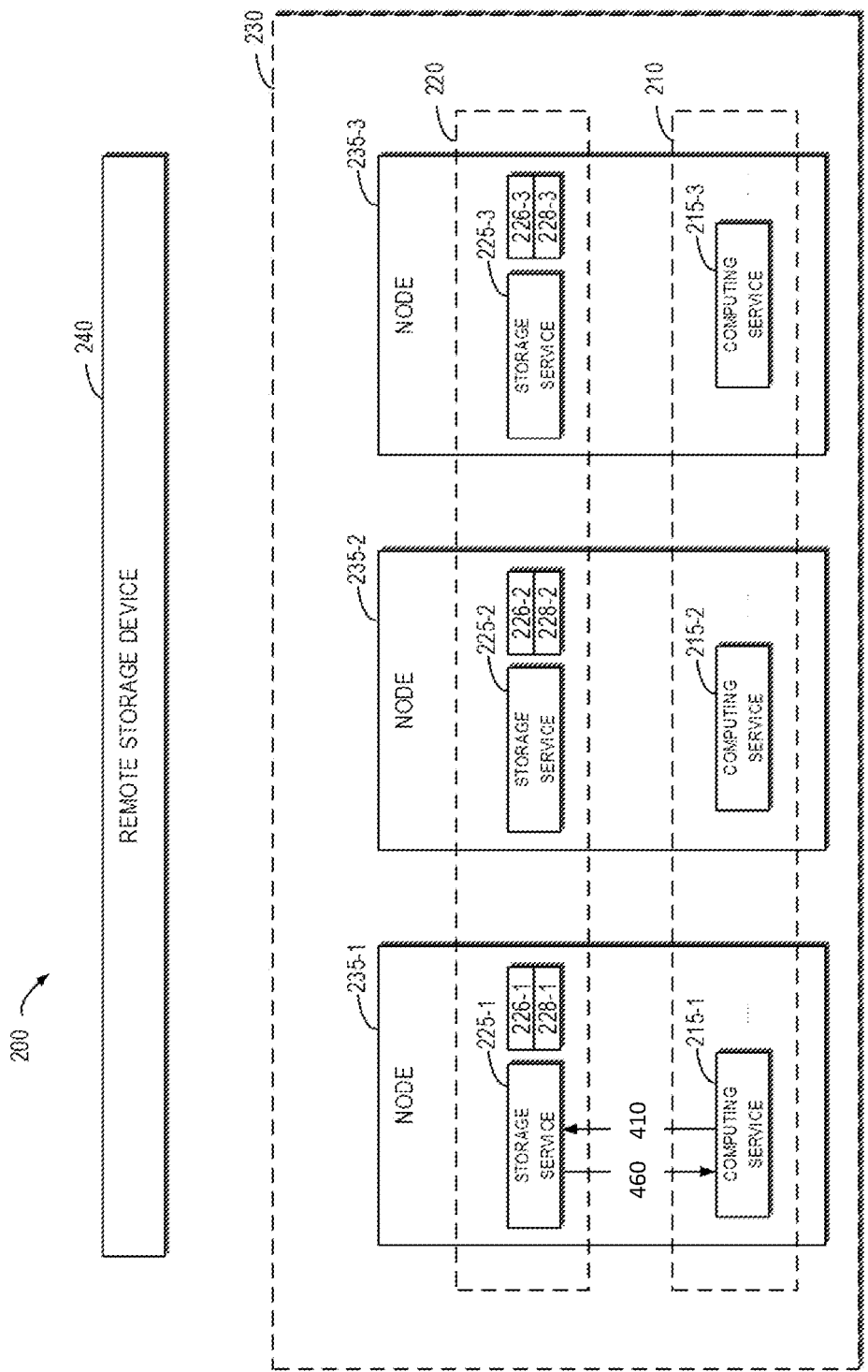
FIG. 4 illustrates a storage management example where target data is stored in a local storage device according to some embodiments of the present disclosure.

FIG. 4 illustrates a storage management example where target data is stored in a local storage device according to some embodiments of the present disclosure. In the example of FIG. 4, description will be made with reference to the storage service 225-1 responding to a data request of the computing service 215-1. It should be noted that, although the description will be given with reference to the storage service 225-1, other storage services can perform a similar operation. After receiving 410 a request from the computing service 215-1, the storage service 225-1 may determine, based on the request, whether the target data is stored in the local storage device 226-1 of the node 235-1 deploying the storage service 225-1. In the example of FIG. 4, since the target data is stored in the local storage device 226-1, the storage service 225-1 may directly obtain the target data from the local storage device 226-1 and provide 460 the target data to the computing service 215-1.

As can be seen from the above, in the case that the target data is stored in the local storage device, the storage management process is simple and efficient, and can avoid requesting the remote storage device, thereby improving the efficiency and reducing the costs.

However, the target data may not be stored in the local storage device. In this case, a distributed hash table for locating the target data may be employed for the storage management process. More specifically, each storage service 225 has a respective distributed hash table 228. The distributed hash table 228 stores a hash result of a hash operation performed on an identification (e.g., a file name, address, and the like) of data in association with a storage position of the data in a local storage device 226 of another node 235 or in the remote storage device 240. In other words, the distributed hash table 228 may be used to locate the data stored in a local storage device of another node or the remote storage device.

It would be appreciated that, since the node cluster 230 includes a large number of nodes 235, each node 235 is not fully aware of the states of other nodes. As such, the distributed hash table 228 of each storage service 225 only stores information of a part of the complete dataset, rather than information of the complete dataset used in the task.

Figure 5:
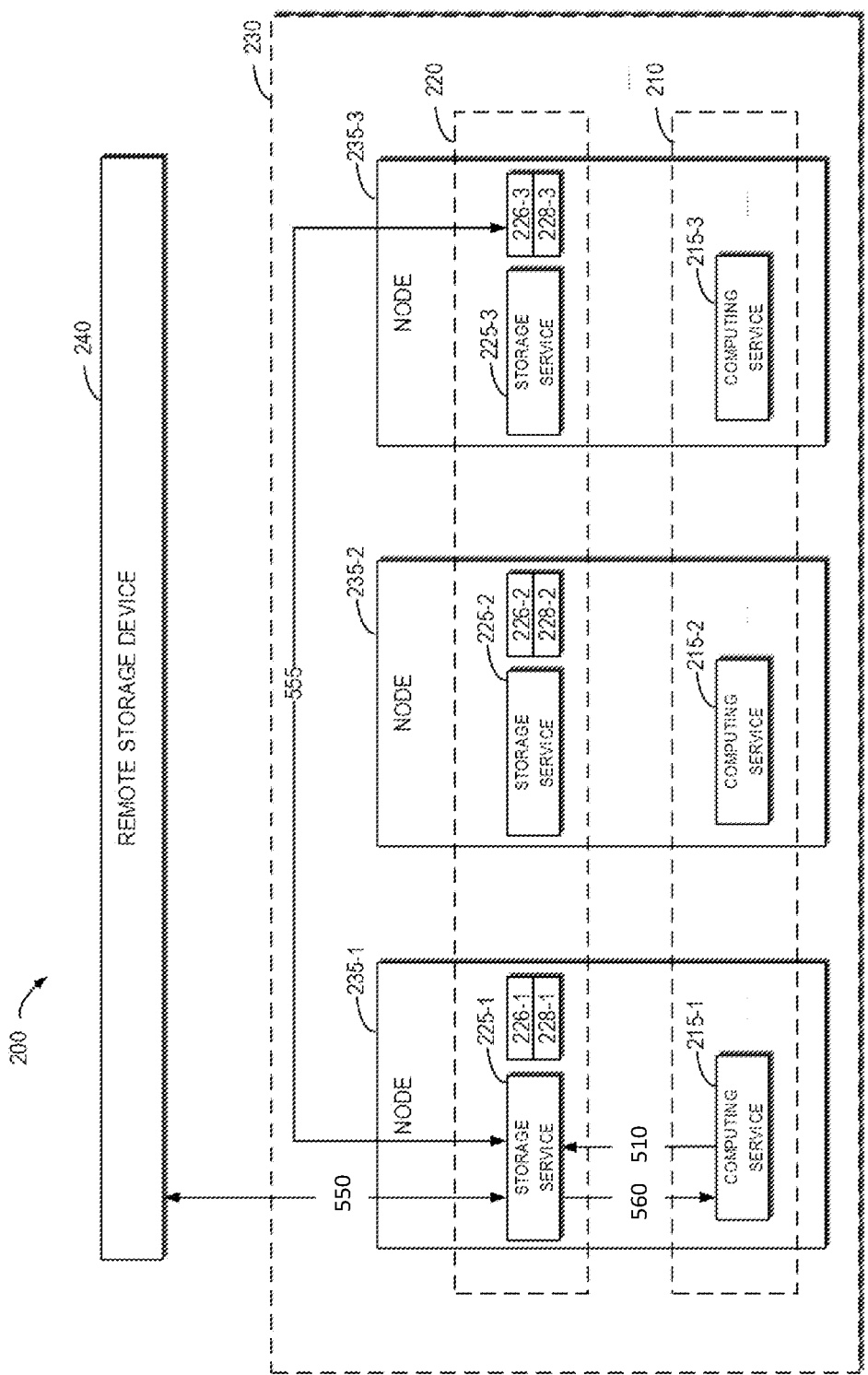
FIG. 5 illustrates a storage management example where a storage position of target data is stored in a local distributed hash table according to some embodiments of the present disclosure.

FIG. 5 illustrates a storage management example where a storage position of target data is stored in a local distributed hash table according to some embodiments of the present disclosure. In the example of FIG. 5, the description will be made with reference to the storage service 225-1 responding to a data request of the computing device 215-1. It should be noted that, although the description will be given with reference to the storage service 225-1, other storage services can perform a similar operation.

After receiving 510 a request from the computing service 215-1, the storage service 225-1 determines, based on the request, whether the target data is stored in the local storage device 226-1 of the node 235-1 deploying the storage service 225-1. In the example of FIG. 5, the storage service 225-1 determines that the target data is not stored in the local storage device 226-1. Therefore, the storage service 225-1 is unable to obtain the target data from the local storage device 226-1.

In this case, the storage service 225-1 may use its distributed hash table 228-1. In some embodiments, the storage service 225-1 may obtain the identification of the target data from the request, perform a hash operation on the identification of the target data, and generate a hash result for the target data. The storage service 225-1 may obtain, based on the hash result, the target data using the distributed hash table 228-1.

The storage service 225-1 may determine whether the hash result is stored in the distributed hash table 228-1. In the example of FIG. 5, it is assumed that the hash result is stored in the distributed hash table 228-1. In this case, the storage service 225-1 may obtain the target data from the storage position stored in association with the hash result in the distributed hash table 228-1. For example, when the storage position is located in a local storage device of another node (e.g., the local storage device 226-3 of the node 235-3), the storage service 225-1 may obtain 555 the target data from the local storage device 226-3. When the storage position is located in the remote storage device 240, the storage service 225-1 may obtain 550 the target data from the remote storage device 240.

Then, the storage service 225-1 may provide 560 the target data to the computing service 215-1. In some embodiments, apart from providing 560 the target data to the computing service 215-1, the storage service 225-1 may also store the target data in the local storage device 226-1. Considering that the local storage device 226-1 has a limited capacity, the storage service 225-1 may also use a Lease Recently Used (LRU) algorithm to manage the data stored in the local storage device 226-1, such that the local storage device 226-1 can be used efficiently.

Figure 6:
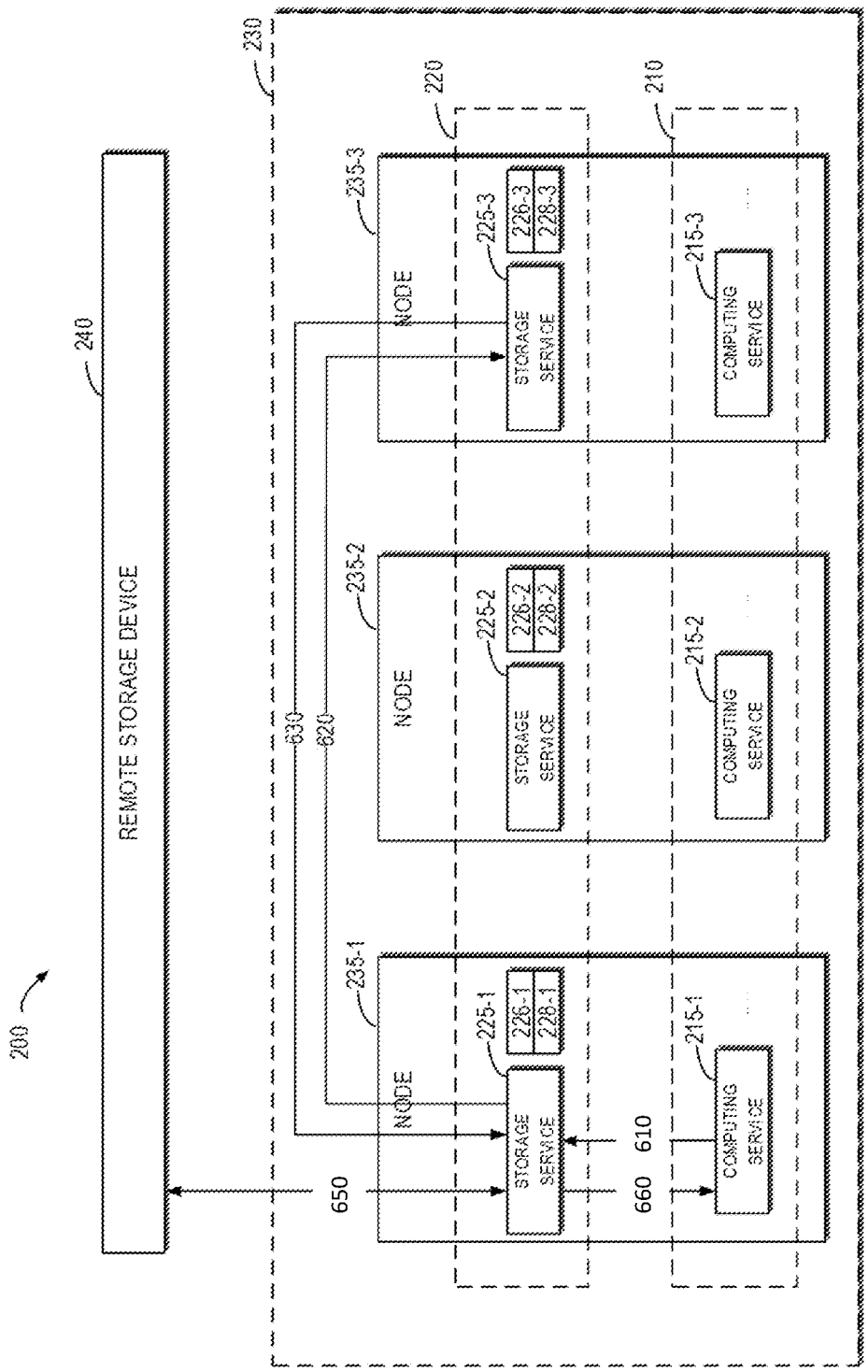
FIG. 6 illustrates a storage management example where a storage position of target data is not stored in a local distributed hash table according to some embodiments of the present disclosure.

FIG. 6 illustrates a storage management example where a storage position of target data is not stored in a local distributed hash table according to some embodiments of the present disclosure. In the example of FIG. 6, the description will be made with reference to the storage service 225-1 responding to a data request of the computing service 215-1. It should be noted that, although the description will be given with reference to the storage service 225-1, other storage services can perform a similar operation.

In the example of FIG. 6, the storage service 225-1 obtains 610 a request for target data from the computing service 215-1 and determines that the hash result is not stored in the distributed hash table 228-1. In this case, the storage service 225-1 may determine a storage service (e.g., the storage service 225-3) from other storage services deployed at other nodes. A similarity between a hash result of a hash operation performed on an identification (e.g., a storage service name, storage service address, and the like) of the storage service 225-3 and a hash result of target data exceeds a similarity threshold. For example, the Hamming distance between the hash results is the shortest.

The storage service 225-1 may send 620 to the storage service 225-3 a request for determining a target storage position of target data. The storage service 225-3 may determine the target storage position in a similar manner as the storage service 225-1. In some embodiments, the storage service 225-3 may determine, based on the request, whether the target data is stored in the local storage device 226-3 of the node 235-3 deploying the storage service 225-3. When the target data is stored in the local storage device 226-3, the storage service 225-3 may send to the storage service 225-1 the storage position of the target data in the local storage device 226-3.

When the target data is not stored in the local storage device 226-3, the storage device 226-3 may cause the target storage position of the target data to be determined based on the hash result of the hash operation performed on the identification of the target data and using a distributed hash table 228-3.

In some embodiments, the storage service 225-3 may determine whether the hash result is stored in the distributed hash table 228-3. In the example of FIG. 6, it is assumed that the hash result is stored in the distributed hash table 228-3. In this case, the storage service 225-3 may provide the storage service 225-1 with the storage position (e.g., the address in the remote storage device 240 where the target data is stored) stored in association with the hash result in the distributed hash result 228-3.

It is worth noting that, although not shown in FIG. 6, the storage service 225-3 may continue to determine a storage service (e.g., the storage service 225-2) in other storage services deployed at other nodes if the hash result is not stored in the distributed hash table 228-3, where a similarity between the hash result of the hash operation performed on the identification of the storage service 225-2 and the hash result of the target data exceeds the similarity threshold.

The storage service 225-3 may send to the storage service 225-2 a request for determining a target storage position of the target data. After receiving the request, the storage service 225-2 performs an operation similar to that of the storage service 225-3 for determining the target storage position. In this way, the target storage position can be searched node by node until it is found.

In some embodiments, the storage service 225 which finds the target storage position may provide the target storage position to the previous storage service 225. If the request for determining the target storage position includes an address of a source storage service 225, the storage service 225 which finds the target storage position may provide the target storage position directly to the source storage service 225. Here, the source storage service 225 refers to a storage service 225 receiving a request from the computing service 215.

It would be appreciated that the operation for determining the target storage position performed by the storage service 225-3 may be performed by any storage service (e.g., the storage service 225-1 or 225-2).

Returning to FIG. 6, the storage service 225-1 may receive 630 the target storage position from the storage service 225-3, and obtain 650 the target data from the remote storage device 240. Then, the storage service 225-1 may provide 660 the target data to the computing service 215-1. As described above, in some embodiments, the storage service 225-1 may store the target data in the local storage device 226-1. In addition, the storage service 225-1 may update its distributed hash table 228-1. More specifically, the storage service 225-1 may store the hash result of the target data in association with the target storage position (e.g., an address in the remote storage device 240 where the target data is stored) in the distributed hash table 228-1.

In this way, when performing the task next time, the storage service 225-1 may provide the target data required by the task from its local storage device 226-1, and may also be aware of the target storage position of the target data.

Since the storage management environment 200 includes a remote storage device 240 and a plurality of local storage devices 226, data required for a task may be included in a plurality of storage devices. In order to accelerate the data obtaining, the solution can support concurrent data obtaining from a plurality of storage devices.

Figure 7:
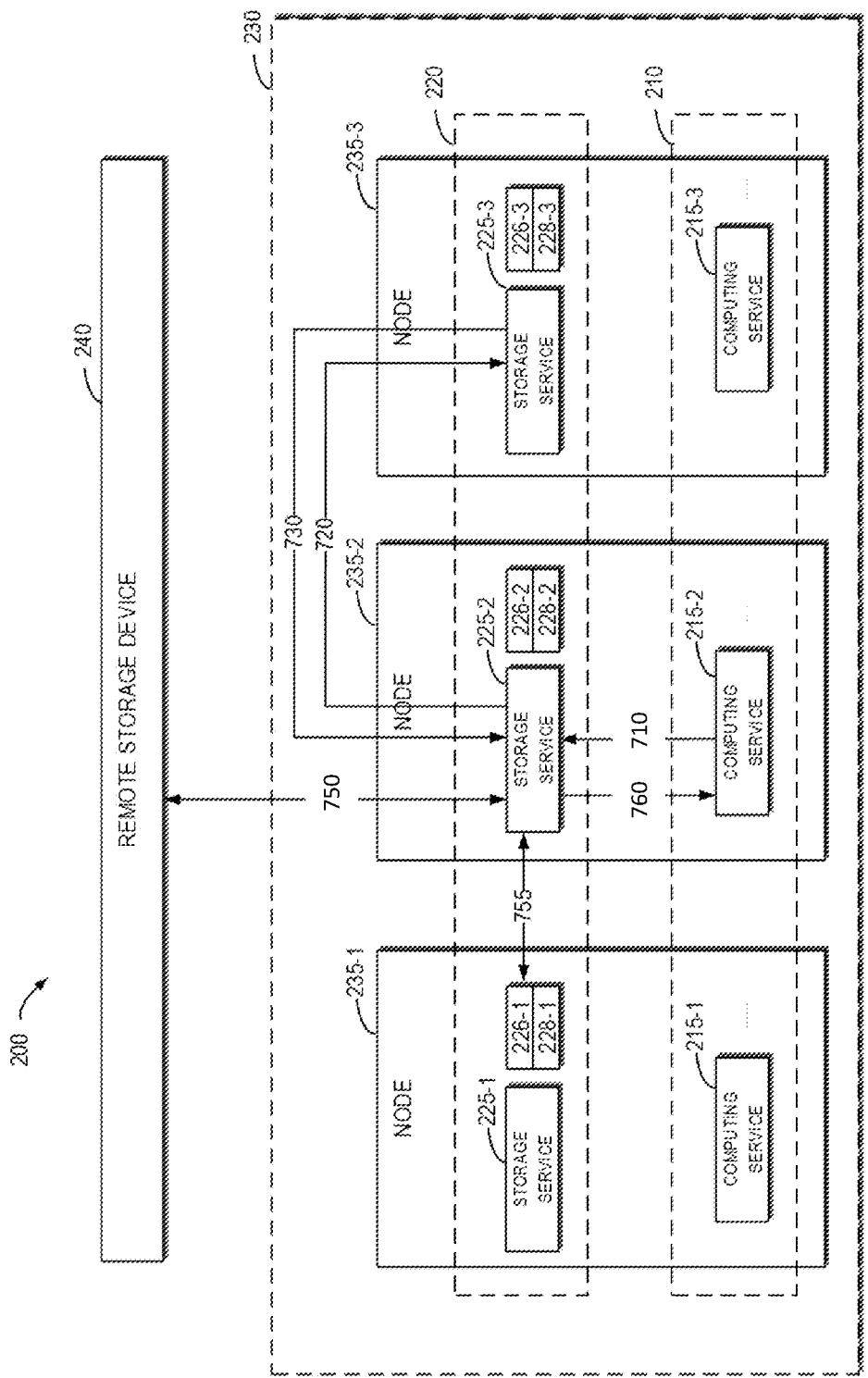
FIG. 7 illustrates a storage management example of implementing concurrent data obtaining according to some embodiments of the present disclosure.

FIG. 7 illustrates a storage management example of implementing concurrent data obtaining according to some embodiments of the present disclosure. In the example of FIG. 7, the description will be made with reference to the storage service 225-2 responding to a data request of the computing service 215-1. It should be noted that, although the description will be given with reference to the storage service 225-2, other storage services may perform a similar operation.

The storage service 225-2 obtains 710 a request for the target data from the computing service 215-2. The storage service 225-2 determines that the target data is not stored in the local storage device 226-2, nor is the hash result of the target data stored in the distributed hash table 228-2. In this case, the storage service 225-2 may send 720 to the storage service 235-3 a request for determining target storage positions of the target data. A similarity between a hash result of a hash operation performed on the identification of the storage service 225-3 and a hash result of the target data exceeds a similarity threshold.

The storage service 225-3 may determine the target storage position and provide it to the storage service 225-2. In the example of FIG. 7, the target storage position indicates not only an address of the target data stored in the remote storage device 240 but also an address of the target data stored in the local storage device 226-1.

The storage service 225-2 may receive 730 the target storage position from the storage service 225-3, and concurrently obtain 750, 755 the target data from the remote storage device 240 and the local storage device 226-1, respectively. It should be noted that, the target storage position indicating an address in the remote storage device 240 and an address in the local storage device 226-1 are illustrative. As a matter of fact, the target storage position may indicate an address in the remote storage device 240 and/or addresses in any number of storage devices in the plurality of local storage devices 226, so as to implement the concurrency.

Subsequently, the storage service 225-2 may provide 760 the target data to the computing service 215-2. In addition, like the storage service 225-1, the storage service 225-2 may also store the target data and update its distributed hash table 228-2 to record the target data and the target storage position thereof.

Although the concurrency can accelerate the data obtaining, it is not inexpensive to obtain massive data from the remote storage device 240, and the stable data obtaining speed may not be guaranteed, as discussed above. To this end, in some embodiments, if the local storage device 226 includes the target data, the storage service 225 will not obtain data from the remote storage device 240.

Figure 8:
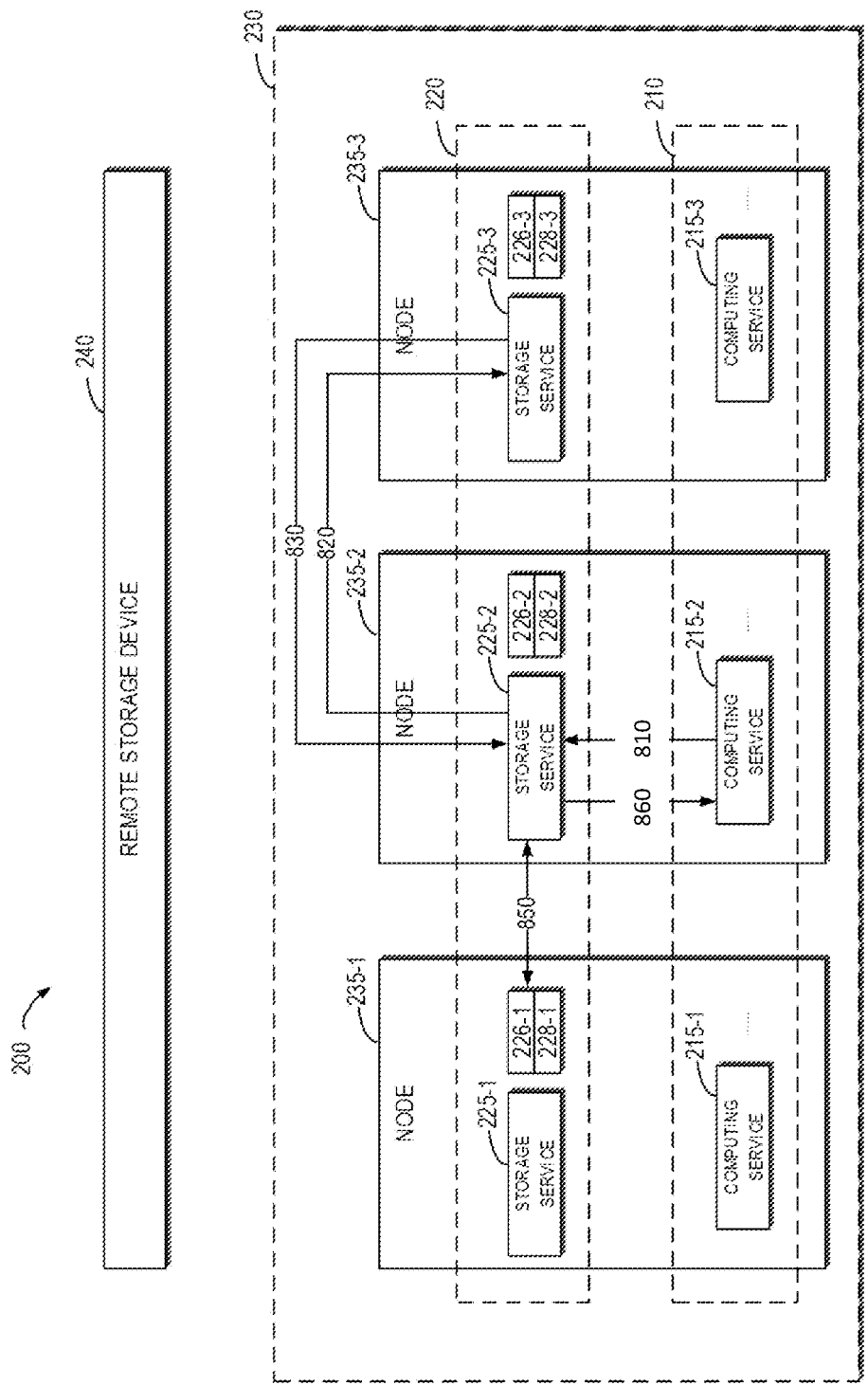
FIG. 8 illustrates a storage management example of implementing intelligent data obtaining according to some embodiments of the present disclosure.

FIG. 8 illustrates a storage management example of implementing intelligent data obtaining according to some embodiments of the present disclosure. In the example of FIG. 8, the description will be made with reference to the storage service 225-2 responding to a data request of the computing service 215-1. It should be noted that, although the description will be given with reference to the storage service 225-2, other storage services may perform a similar operation.

The storage service 225-2 obtains 810 a request for target data from the computing service 215-2. The storage service 225-2 determines that the target data is not stored in the local storage device 226-2, nor is the hash result of the target data stored in the distributed hash table 228-2. In this case, the storage service 225-2 may send 820 to the storage service 235-3 a request for determining target storage positions of the target data. A similarity between a hash result of a hash operation performed on the identification of the storage service 225-3 and the hash result of the target data exceeds a similarity threshold. The storage service 225-3 may determine the target storage position and provide it to the storage service 225-2.

Similar to FIG. 7, in the example of FIG. 8, it is also assumed that the target storage position indicates not only an address of the target data stored in the remote storage device 240, but also an address of the target data in the local storage device 226-1.

However, after determining the target data is stored in the remote storage device 240 and the local storage device 226-1, the storage service 225-2 provides only the storage position of the target data in the local storage device 226-1 to the storage service 225-2, without providing the storage position of the target data in the remote storage device 240.

To this end, the target storage position received 830 by the storage service 225-2 from the storage service 225-3 only indicates the storage position of the target data in the local storage device 226-1. As a result, the storage service 225-2 obtains 850 the target data only from the local storage device 226-1, rather than from the remote storage device 240. In this way, the solution can avoid access to the remote storage device 240 and thus reducing the costs. Subsequently, the storage service 225-2 may provide 860 the target data to the computing service 215-2.

Figure 9:
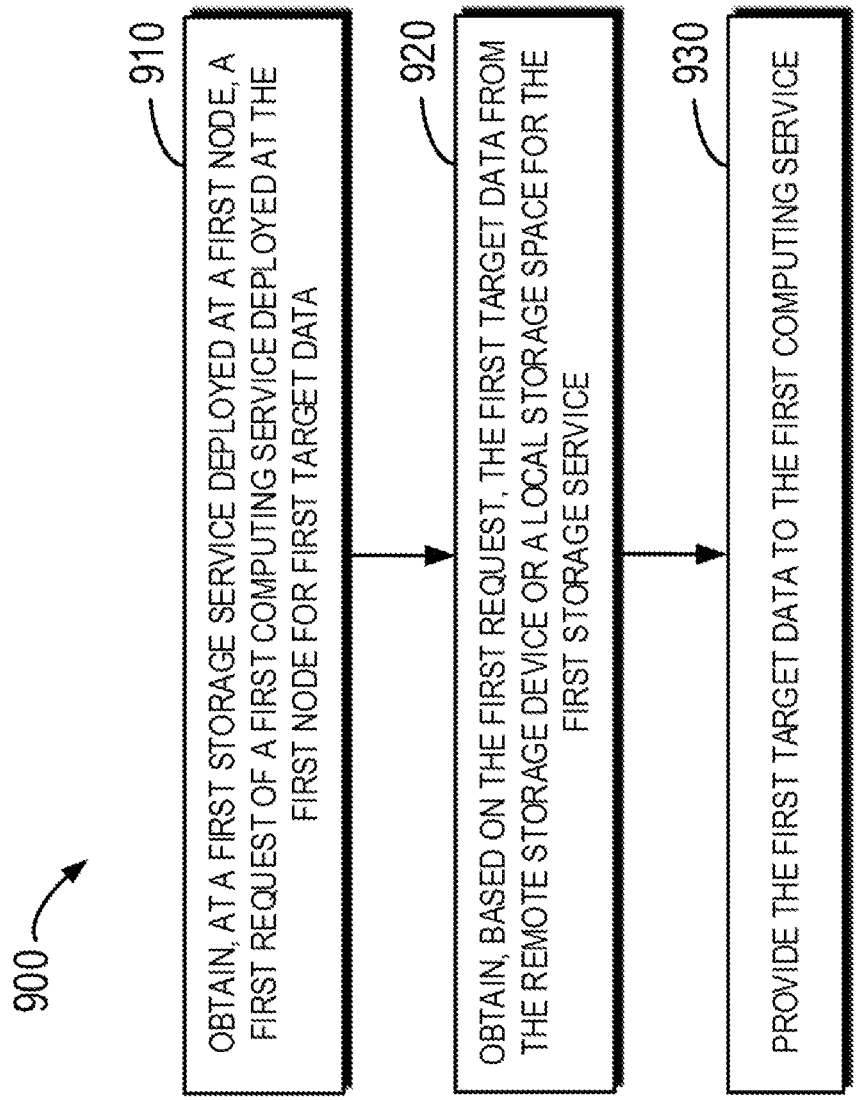
FIG. 9 illustrates a flowchart of a method for storage management according to some embodiments of the present disclosure.

FIG. 9 illustrates a flowchart of a method 900 for storage management according to some embodiments of the present disclosure. The method 900, for example, may be implemented at the storage service 225 as shown in FIG. 2. For ease of discussion, the method 900 will be described below with reference to FIG. 2. It would be appreciated that the method 900 may include additional steps not shown and/or skip the steps shown, and the scope of the present disclosure is not limited in this regard.

At 910, a first request of a first computing service deployed at a first node for first target data is obtained at a first storage service deployed at the first node. The first storage service has access to a remote storage device and provides the first computing service with the same access interface as the remote storage device. The remote storage device stores a dataset reusable in a task to be performed at least partially by the first computing service, and the dataset comprises the first target data. At 920, based on the first request, the first target data is obtained from the remote storage device or a local storage space for the first storage service. At 930, the first target data is provided to the first computing service.

In some embodiments, the task comprises a distributed deep learning task performed jointly by the first computing service and a further computing service deployed at at least one further node, and the first target data comprises data used in an epoch of the distributed deep learning task.

In some embodiments, obtaining the first target data comprises: determining, based on the first request, whether the first target data is stored in a first local storage device of the first node; and in accordance with a determination that the first target data is stored in the first local storage device, obtaining the first target data from the first local storage device.

In some embodiments, the task is performed jointly by the first computing service and at least one further computing service deployed at least one further node, and the first storage service has a distributed hash table. The distributed hash table stores a hash result of a hash operation performed on an identification of at least partial data in the dataset in association with a storage position of the at least partial data in a further local storage device of the at least one further node or the remote storage device. Obtaining the first target data comprises: in accordance with a determination that the first target data is not stored in the first local storage device: obtaining an identification of the first target data from the first request; generating a first hash result for the first target data by performing a hash operation on the identification of the first target data; and obtaining, based on the first hash result, the first target data using the distributed hash table.

In some embodiments, obtaining, based on the first hash result, the first target data using the distributed hash table comprises: determining whether the first hash result is stored in the distributed hash table; in accordance with a determination that the first hash result is stored in the distributed hash table, obtaining the first target data from a storage position stored in association with the first hash result in the distributed hash table; and in accordance with a determination that the first hash result is not stored in the distributed hash table: determining a second storage service in at least one further storage service deployed at the at least one further node, a similarity between a second hash result of a hash operation performed on an identification on the second storage service and the first hash result exceeding a similarity threshold; sending, to the second storage service, a second request for determining a first target storage position of the first target data; receiving the first target storage position from the second storage service; and obtaining the first target data from the first target storage position.

In some embodiments, in accordance with a determination that the first target data is obtained from the first target storage position, the first target data is stored in the first local storage device; and the first hash result is stored in association with the first target storage position in the distributed hash table.

In some embodiments, the task is performed jointly by the first computing service and at least one further computing service deployed at least one further node, the method further comprising: obtaining a third request for determining a second target storage position of second target data from a third storage service of at least one further storage service deployed at the at least one further node; determining, based on the third request, whether the second target data is stored in a first local storage device of the first node; in accordance with a determination that the second target data is stored in the first local storage device, sending, to the third storage service, a storage position of the second target data in the first local storage device; and in accordance with a determination that the second target data is not stored in the first local storage device, causing, based on a second hash result of a hash operation performed on an identification of the second target data, a second target storage position of the second target data to be determined using a distributed hash table corresponding to the first storage service.

In some embodiments, in accordance with the second target data being determined to be stored in the remote storage device and a further local storage device of the at least one further node, a storage position of the second target data in the further local storage device is caused to be provided to the third storage service, without causing a storage position of the second target data in the remote storage device to be provided to the third storage service.

Figure 10:
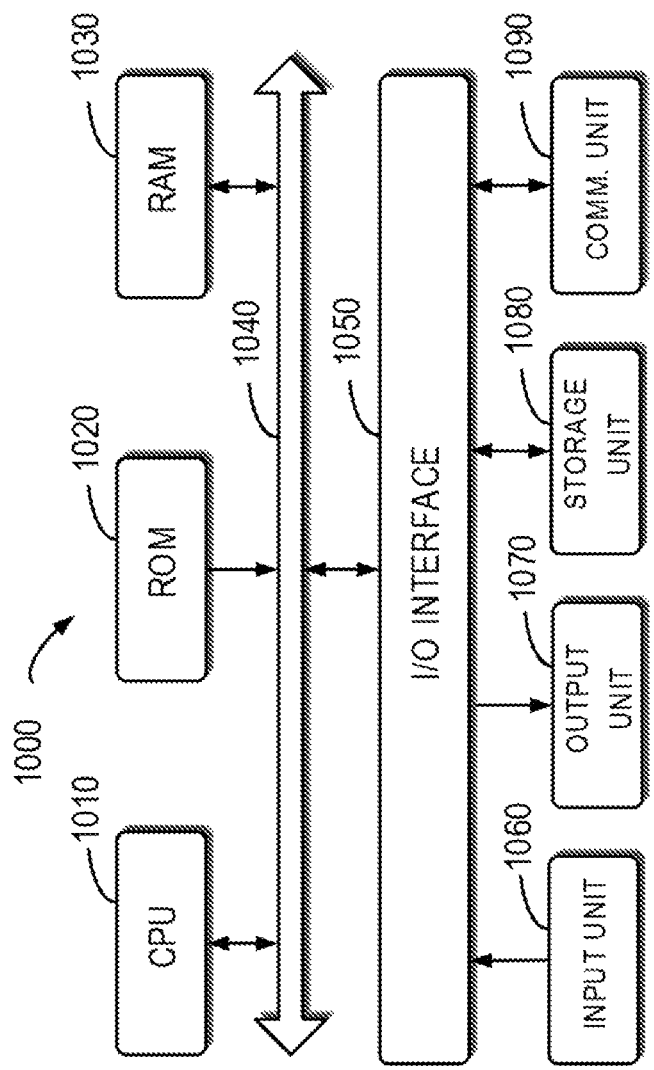
FIG. 10 illustrates a schematic block diagram of an example device that can be used to implement embodiments of the present disclosure.

FIG. 10 illustrates a block diagram of an example device 1000 that may be used to implement embodiments of the present disclosure. For example, the storage service 225 as shown in FIG. 2 may be implemented by the device 1000. As shown, the device 1000 includes a central processing unit (CPU) 1010 which performs various appropriate acts and processing, based on computer program instructions stored in a read-only memory (ROM) 1020 or computer program instructions loaded from a storage unit 1080 to a random access memory (RAM) 1030. The RAM 1030 stores therein various programs and data required for operations of the device 1000. The CPU 1010, the ROM 1020 and the RAM 1030 are connected via a bus 1040 with one another. An input/output (I/O) interface 1050 is also connected to the bus 1040.

The following components in the device 1000 are connected to the I/O interface 1050: an input unit 1060 such as a keyboard, a mouse and the like; an output unit 1070 including various kinds of displays and a loudspeaker, etc.; a storage unit 1080 including a magnetic disk, an optical disk, and etc.; a communication unit 1090 including a network card, a modem, and a wireless communication transceiver, etc. The communication unit 1090 allows the device 1000 to exchange information/data with other devices through a computer network such as the Internet and/or various kinds of telecommunications networks.

Various processes and processing described above, e.g., the method 900, may be executed by the processing unit 1010. For example, in some embodiments, the method 900 may be implemented as a computer software program that is tangibly included in a machine-readable medium, e.g., the storage unit 1080. In some embodiments, part or all of the computer programs may be loaded and/or mounted onto the device 1000 via ROM 1020 and/or communication unit 1090. When the computer program is loaded to the RAM 1030 and executed by the CPU 1010, one or more acts of the method 900 as described above may be performed.

The present disclosure may be a method, device, system, and/or computer program product. The computer program product may include a computer-readable storage medium having computer-readable program instructions thereon for carrying out aspects of the present disclosure.

The computer-readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card and/or network interface in each computing/processing device receive computer-readable program instructions from the network and forward the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing status information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the functions/acts specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storage management, comprising:
obtaining, at a first storage service deployed at a first node, a first request of a first computing service deployed at the first node for first target data, the first storage service having access to a remote storage device and providing the first computing service with a same access interface as the remote storage device, the remote storage device storing a dataset reusable in a task to be performed at least partially by the first computing service, the dataset comprising the first target data;
obtaining, based on the first request, the first target data from the remote storage device or a local storage space for the first storage service; and
providing the first target data to the first computing service;
wherein obtaining the first target data comprises:
determining, based on the first request, whether the first target data is stored in a first local storage device of the first node; and
in accordance with a determination that the first target data is stored in the first local storage device, obtaining the first target data from the first local storage device; and
wherein the task is performed by the first computing service in cooperation with at least one further computing service deployed at least one further node, and the first storage service has a distributed hash table, the distributed hash table storing a hash result of a hash operation performed on an identification of at least partial data in the dataset in association with a storage position of the at least partial data in a further local storage device of the at least one further node or the remote storage device, and obtaining the first target data comprises:
in accordance with a determination that the first target data is not stored in the first local storage device:
obtaining an identification of the first target data from the first request;
generating a first hash result for the first target data by performing a hash operation on the identification of the first target data; and
obtaining, based on the first hash result, the first target data using the distributed hash table.

2. The method of claim 1, wherein the task comprises a distributed deep learning task performed jointly by the first computing service and a further computing service deployed at least one further node, and the first target data comprises data used in an epoch of the distributed deep learning task.

3. The method of claim 1, wherein the task is performed jointly by the first computing service and at least one further computing service deployed at at least one further node, the method further comprising:
obtaining a second request for determining a second target storage position of second target data from a second storage service of at least one further storage service deployed at the at least one further node;
determining, based on the second request, whether the second target data is stored in a first local storage device of the first node;
in accordance with a determination that the second target data is stored in the first local storage device, sending, to the second storage service, a storage position of the second target data in the first local storage device; and
in accordance with a determination that the second target data is not stored in the first local storage device, causing, based on a second hash result of a hash operation performed on an identification of the second target data, a second target storage position of the second target data to be determined using the distributed hash table corresponding to the first storage service.

4. The method of claim 3, further comprising:
in accordance with the second target data being determined to be stored in the remote storage device and a further local storage device of the at least one further node, causing a storage position of the second target data in the further local storage device to be provided to the second storage service, without causing a storage position of the second target data in the remote storage device to be provided to the second storage service.

5. The method of claim 1, wherein obtaining, based on the first hash result, the first target data using the distributed hash table comprises:
determining whether the first hash result is stored in the distributed hash table;
in accordance with a determination that the first hash result is stored in the distributed hash table, obtaining the first target data from a storage position stored in association with the first hash result in the distributed hash table; and
in accordance with a determination that the first hash result is not stored in the distributed hash table:
determining a second storage service in at least one further storage service deployed at the at least one further node, a similarity between a second hash result of a hash operation performed on an identification on the second storage service and the first hash result exceeding a similarity threshold;
sending, to the second storage service, a second request for determining a first target storage position of the first target data;
receiving the first target storage position from the second storage service; and
obtaining the first target data from the first target storage position.

6. The method of claim 5, further comprising:
in accordance with a determination that the first target data is obtained from the first target storage position, storing the first target data in the first local storage device; and
storing the first hash result in association with the first target storage position in the distributed hash table.

7. An electronic device, comprising:

at least one processing unit; and at least one memory coupled to the at least one processing unit and storing instructions executed by the at least one processing unit, the instructions, when executed by the at least one processing unit, causing the device to perform acts comprising:

obtaining, at a first storage service deployed at a first node, a first request of a first computing service deployed at the first node for first target data, the first storage service having access to a remote storage device and providing the first computing service with a same access interface as the remote storage device, the remote storage device storing a dataset reusable in a task to be performed at least partially by the first computing service, the dataset comprising the first target data;

obtaining, based on the first request, the first target data from the remote storage device or a local storage space for the first storage service; and providing the first target data to the first computing service;

wherein obtaining the first target data comprises:

determining, based on the first request, whether the first target data is stored in a first local storage device of the first node; and in accordance with a determination that the first target data is stored in the first local storage device, obtaining the first target data from the first local storage device; and wherein the task is performed by the first computing service in cooperation with at least one further computing service deployed at least one further node, and the first storage service has a distributed hash table, the distributed hash table storing a hash result of a hash operation performed on an identification of at least partial data in the dataset in association with a storage position of the at least partial data in a further local storage device of the at least one further node or the remote storage device, and obtaining the first target data comprises:

in accordance with a determination that the first target data is not stored in the first local storage device:

obtaining an identification of the first target data from the first request;

generating a first hash result for the first target data by performing a hash operation on the identification of the first target data; and obtaining, based on the first hash result, the first target data using the distributed hash table.

8. The device of claim 7, wherein the task comprises a distributed deep learning task performed jointly by the first computing service and a further computing service deployed at least one further node, and the first target data comprises data used in an epoch of the distributed deep learning task.

9. The device of claim 7, wherein obtaining, based on the first hash result, the first target data using the distributed hash table comprises:

determining whether the first hash result is stored in the distributed hash table;

in accordance with a determination that the first hash result is stored in the distributed hash table, obtaining the first target data from a storage position stored in association with the first hash result in the distributed hash table; and in accordance with a determination that the first hash result is not stored in the distributed hash table:

determining a second storage service in at least one further storage service deployed at the at least one further node, a similarity between a second hash result of a hash operation performed on an identification on the second storage service and the first hash result exceeding a similarity threshold;

sending, to the second storage service, a second request for determining a first target storage position of the first target data;

receiving the first target storage position from the second storage service; and obtaining the first target data from the first target storage position.

10. The device of claim 9, wherein the acts further comprise:

in accordance with a determination that the first target data is obtained from the first target storage position, storing the first target data in the first local storage device; and storing the first hash result in association with the first target storage position in the distributed hash table.

11. The device of claim 7, wherein the task is performed jointly by the first computing service and at least one further computing service deployed at at least one further node, and the acts further comprise:

obtaining a second request for determining a second target storage position of second target data from a second storage service of at least one further storage service deployed at the at least one further node;

determining, based on the second request, whether the second target data is stored in a first local storage device of the first node;

in accordance with a determination that the second target data is stored in the first local storage device, sending, to the second storage service, a storage position of the second target data in the first local storage device; and in accordance with a determination that the second target data is not stored in the first local storage device, causing, based on a second hash result of a hash operation performed on an identification of the second target data, a second target storage position of the second target data to be determined using the distributed hash table corresponding to the first storage service.

12. The device of claim 11, wherein the acts further comprise:

in accordance with the second target data being determined to be stored in the remote storage device and a further local storage device of the at least one further node, causing a storage position of the second target data in the further local storage device to be provided to the second storage service, without causing a storage position of the second target data in the remote storage device to be provided to the second storage service.

13. The device of claim 7, wherein the distributed hash table stores information of a part of the dataset.

14. A computer program product tangibly stored on a non-transient computer-readable medium and including machine-executable instructions which, when executed, cause a machine to perform acts comprising:

obtaining, at a first storage service deployed at a first node, a first request of a first computing service deployed at the first node for first target data, the first storage service having access to a remote storage device and providing the first computing service with a same access interface as the remote storage device, the remote storage device storing a dataset reusable in a task to be performed at least partially by the first computing service, the dataset comprising the first target data;

obtaining, based on the first request, the first target data from the remote storage device or a local storage space for the first storage service; and providing the first target data to the first computing service;

wherein obtaining the first target data comprises:

determining, based on the first request, whether the first target data is stored in a first local storage device of the first node; and in accordance with a determination that the first target data is stored in the first local storage device, obtaining the first target data from the first local storage device; and wherein the task is performed by the first computing service in cooperation with at least one further computing service deployed at least one further node, and the first storage service has a distributed hash table, the distributed hash table storing a hash result of a hash operation performed on an identification of at least partial data in the dataset in association with a storage position of the at least partial data in a further local storage device of the at least one further node or the remote storage device, and obtaining the first target data comprises:

in accordance with a determination that the first target data is not stored in the first local storage device:

obtaining an identification of the first target data from the first request;

generating a first hash result for the first target data by performing a hash operation on the identification of the first target data; and obtaining, based on the first hash result, the first target data using the distributed hash table.

15. The computer program product of claim 14, wherein the task comprises a distributed deep learning task performed jointly by the first computing service and a further computing service deployed at least one further node, and the first target data comprises data used in an epoch of the distributed deep learning task.

16. The computer program product of claim 14, wherein obtaining, based on the first hash result, the first target data using the distributed hash table comprises:

determining whether the first hash result is stored in the distributed hash table;

in accordance with a determination that the first hash result is stored in the distributed hash table, obtaining the first target data from a storage position stored in association with the first hash result in the distributed hash table; and in accordance with a determination that the first hash result is not stored in the distributed hash table:

determining a second storage service in at least one further storage service deployed at the at least one further node, a similarity between a second hash result of a hash operation performed on an identification on the second storage service and the first hash result exceeding a similarity threshold;

sending, to the second storage service, a second request for determining a first target storage position of the first target data;

receiving the first target storage position from the second storage service; and obtaining the first target data from the first target storage position.

17. The computer program product of claim 16, wherein the acts further comprise:

in accordance with a determination that the first target data is obtained from the first target storage position, storing the first target data in the first local storage device; and storing the first hash result in association with the first target storage position in the distributed hash table.

18. The computer program product of claim 14, wherein the task is performed jointly by the first computing service and at least one further computing service deployed at at least one further node, and the acts further comprise:

obtaining a second request for determining a second target storage position of second target data from a second storage service of at least one further storage service deployed at the at least one further node;

determining, based on the second request, whether the second target data is stored in a first local storage device of the first node;

in accordance with a determination that the second target data is stored in the first local storage device, sending, to the second storage service, a storage position of the second target data in the first local storage device; and in accordance with a determination that the second target data is not stored in the first local storage device, causing, based on a second hash result of a hash operation performed on an identification of the second target data, a second target storage position of the second target data to be determined using the distributed hash table corresponding to the first storage service.

19. The computer program product of claim 18, wherein the acts further comprise:

in accordance with the second target data being determined to be stored in the remote storage device and a further local storage device of the at least one further node, causing a storage position of the second target data in the further local storage device to be provided to the second storage service, without causing a storage position of the second target data in the remote storage device to be provided to the second storage service.

20. The computer program product of claim 14, wherein the distributed hash table stores information of a part of the dataset.

* * * * *

UNITED STATES PATENT AND TRADEMARK OFFICE
CERTIFICATE OF CORRECTION

PATENT NO. : 11,461,284 B2
APPLICATION NO. : 16/836176
DATED : October 4, 2022
INVENTOR(S) : YuHong Nie et al.

It is certified that error appears in the above-identified patent and that said Letters Patent is hereby corrected as shown below:

In the Claims

Claim 1, Column 15, Line 48, please delete "deployed at least one further node" and insert therefor --deployed at at least one further node--

Claim 2, Column 16, Lines 1-2, please delete "deployed at least one further node" and insert therefor --deployed at at least one further node--

Claim 7, Column 17, Line 33, please delete "deployed at least one further node" and insert therefor --deployed at at least one further node--

Claim 8, Column 17, Lines 53-54, please delete "deployed at least one further node" and insert therefor --deployed at at least one further node--

Claim 14, Column 19, Line 19, please delete "deployed at least one further node" and insert therefor --deployed at at least one further node--

Claim 15, Column 19, Line 40, please delete "deployed at least one further node" and insert therefor --deployed at at least one further node--

Signed and Sealed this
Eighth Day of November, 2022

Katherine Kelly Vidal
*Director of the United States Patent and Trademark Office*